United States Patent [19]
Lindblom

[11] 3,742,990
[45] July 3, 1973

[54] DELIMBING ARRANGEMENT
[75] Inventor: Karl Thore Lindblom, Alfta, Sweden
[73] Assignee: Ostbergs Fabriks AB, Alfta, Sweden
[22] Filed: Oct. 4, 1971
[21] Appl. No.: 186,259

[30] Foreign Application Priority Data
Oct. 6, 1970 Sweden............................. 13511/70

[52] U.S. Cl................................................ 144/2 Z
[51] Int. Cl............................................ A01g 23/00
[58] Field of Search.................. 144/2 Z, 3 D, 34 R, 144/309 AC

[56] References Cited
UNITED STATES PATENTS
| 2,948,311 | 8/1960 | McCollum | 144/2 Z |
| 2,989,097 | 6/1961 | Bombardier | 144/2 Z |
| 3,461,926 | 8/1969 | Larson | 144/2 Z |
| 3,620,272 | 11/1971 | Eriksson | 144/3 D |
| 3,643,708 | 2/1972 | Lindblom | 144/2 Z |
| 3,659,636 | 5/1972 | Eriksson | 144/2 Z |
| 3,595,288 | 7/1971 | Landers | 144/309 AC |
| 3,443,611 | 5/1969 | Jorgensen | 144/309 AC |

Primary Examiner—Gerald A. Dost
Attorney—Pierce, Scheffler & Parker

[57] ABSTRACT

Two opposed concave arms mounted at one end about a fixed point are pivotal by a drive means between an open position and an overlapping position. At the free end of each arm a shearing chain for delimbing is mounted, the other end being secured in a fixed point located substantially above said first point. Hereby it is possible to delimb tree stems of arbitrary small thickness.

3 Claims, 2 Drawing Figures

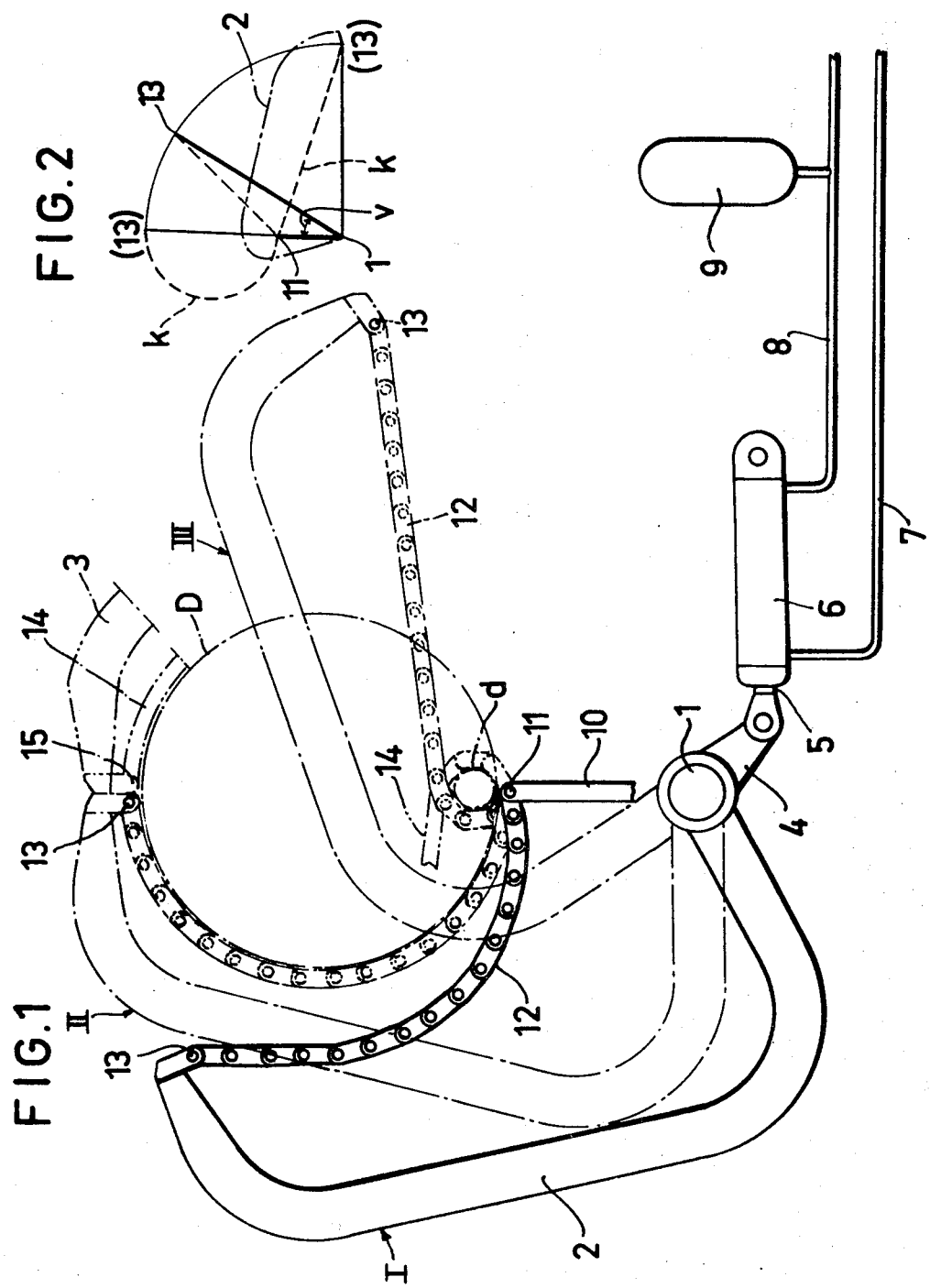

DELIMBING ARRANGEMENT

This invention relates to a delimbing arrangement of the kind comprising two curved arms placed mirror-symmetric relative one another, with their concavities facing each other, which arms at one end are mounted about a fixed axle and pivotal by a drive means between an open position and an overlapping position, a shearing chain with its periphery cutting in the longitudinal direction of the tree stem being so secured between a first point on the free end of each arm and a second fixed point, that upon overlapping of the arms the two shearing chains are caused to embrace intersectingly the tree stem.

The conventional delimbing arrangements of the aforesaid general kind, represented e.g. by the arrangement disclosed in the U.S. Pat. specification No. 2,989,097, show the serious shortcoming of having a limited range of grip variation. An arrangement which, for example, is dimensioned for handling thick tree stems cannot be used for delimbing thinner stems of a thickness below a certain dimension, and it even cannot always be used for delimbing the thick stems, either, due to the decreasing stem thickness towards the top portion, so that there remain stumps troublesome to remove lateron by separate tools.

The aforesaid disadvantage is eliminated by the delimbing arrangement according to the invention, which is characterized in that the fixed point for each shearing chain is located spaced from the axle substantially in the direction to the position for the first point when the arms are in their meeting position, so that at the continued swinging movement of the arms to overlapping position the intersecting slack chains, which always are located inside of the curvature of the arms, forcibly are tightened increasingly because of the increase in the distance between the mounting points of each chain caused by the inward swinging movement of the arms, and thereby render possible the delimbing of stems of arbitrary thickness.

The invention is described in greater detail below with reference to the accompanying drawing, in which FIG. 1 shows a schematic lateral view of a delimbing arrangement according to the invention, and FIG. 2 shows a graph illustrating the function of the arrangement.

Two arms curved to bow shape are mounted about a fixed axle 1, so that the concavities of their curvatures face each other. One arm 2 is shown by fully drawn lines in its open position I for receiving a tree stem, and with dash-dotted lines II and III in its positions corresponding to the delimbing of a tree stem with maximum and, respectively, minimum diameter. The second arm 3, which with respect to the vertical plane extending through the axle 1 is arranged mirror-symmetric relative to the arm 2, has been indicated only partially by double dash-dotted lines in order not to complicate the Figure. The arm 2 is provided at its mounting portion with an angular lug 4 having its end connected to the piston rod 5 of a double-acting hydraulic means 6. To said hydraulic means extend a first pressure line 7 for opening the arm, i.e., swinging it outwards, and a second pressure line 8 for closing the arm, i.e., swinging it inwards. To said lastmentioned pressure line 8 is also connected a pressure accumulator 9. The arm 3 is arranged in accurately the same way, so that by simultaneous actuation of the respective hydraulic means the two arms can ge swung towards and past each other (overlapping), and vice versa.

An upright 10 extends from the axle 1 in the direction to the meeting point of the arms in position II. From a point 11 upwardly on said upright runs a shearing chain 12 to a point 13 on the free end of the arm 1. Analogous therewith, a similar shearing chain 14 (only partially indicated by double dash-dotted lines) runs from the same point 11 to the point 15 on the free end of the arm 3.

The curvature of the arms, as appears from the Figure, differs distinctly from the usual semicircular shape, for reasons becoming evident from the following description of the mode of operation.

Diregarding the chains, at the beginning only the geometric configuration of the arms and upright in connection with FIG. 2 are studied. There the fully drawn extents 1–11 and 1–13 represent the height of the upright 10 and, respectively, the effective radius of the arm 2. Due to the fact, that said extents are constant sides in the triangle 1–11–13, upon increase of the angle $v$ (corresponding to the inward swinging movement of the arm) the opposed triangle side, i.e., the extent 11–13, increases to a corresponding degree and for an assumed horizontal final position for the effective radius of the arm is given the length $k$.

If $k$ is assumed replaced by a stretched chain, which motivates and explains the special bow-shaped curvature of the arm in order to prevent collision with the upper end of the upright and permanently to maintain the chain inside of the arm, one can show by a simple mathematic analysis, that upon slackening of the chain by reducing the angle $v$ to zero, a semi-circular shape of the chain $k$ (to the left in FIG. 2) can be obtained for rendering the ratio between 1–11 and 1–13 approximately equal to 1:3.

This is also the case at the exemplified embodiment according to FIG. 1 where the upright 10 extends upwards to about one third of the distance between the axle 1 and the top of the raised arm 2.

For delimbing, at first the pressure line 7 is fed so that the arms are opened to position I for receiving the thick end of a stem. Thereafter the pressure line 8 is fed (from a hydraulic motor not shown) for swinging the arms together to abut the stem and for charging the pressure accumulator 9. Thereafter the feeding is interrupted. When the stem is assumed to have the maximum dimension D, the arms are stopped in the position II, and the delimbing is started by pulling the stem through the circle formed by the chains 12 and 14. As the stem decreases in thickness toward its top, the pressure accumulator automatically causes the arms to increasingly swing past each other whilst the chains increasingly overlap (intersect) each other. Due to the abovementioned automatic extension of the distance between the mounting points 11 and 13 of the chain 12 (as well as the points 11 and 15 of the chain 14) the chains are continuously tightened and thereby effect an adaptive delimbing of the entire stem, from the thick end with the diameter D (for example somewhat over 50 cm) to the top end with the diameter $d$ (for example 5 cm, but theoretically possible down to zero) at the arm position III.

The delimbing operation has an optimum fine result, i.e., without leaving troublesome stumps, owing to the continuous contact along the entire stem length ensured by the pressure accumulator, contrary to the conventional delimbing, at which the contact was varying in steps because it was based on a visual judgment and the hydraulic feed was re-adjusted manually.

The invention is not restricted to the embodiment shown, but different modifications are possible within the scope of the invention, such as the mounting of the arms each about its adjacent axle and a corresponding securing of the lower end of the chains each in its point on a common or separate upright. Furthermore, the curvature of the arms may be varied within wide limits whilst meeting the requirement described in connection with FIG. 2. The arm configuration shown, however, would seem to provide the most compact construction. The distance of the upright 10 (or corresponding member) from the axle relative to the arm top point in the arm position II may also be varied, depending on the area of grip variation required or desired. The pressure accumulator may be replaced by an equivalent arrangement or, when refraining from claiming optimum delimbing fineness, be omitted entirely.

What I claim is:

1. A delimbing arrangement comprising two curved arms placed mirror-symmetric relative one another, with their concavities facing each other, which arms at one end are mounted about a fixed axle and pivotal by a drive means between an open position and an overlapping position, a shearing chain with its periphery cutting in the longitudinal direction of the tree stem being so secured between a first point on the free end of each arm and a second fixed point, that upon overlapping of the arms the two shearing chains are caused to embrace intersectingly the tree stem, characterized in that the fixed point for each shearing chain is located spaced from the axle substantially in the direction to the position for the first point when the arms are in their meeting position, so that at the continued swinging movement of the arms to overlapping position the intersecting slack chains, which always are located inside of the curvature of the arms, forcibly are tightened increasingly because of the increase in the distance between the mounting points of each chain caused by the inward swinging movement of the arms and thereby render possible the delimbing of stems of arbitrary thickness.

2. A delimbing arrangement according to claim 1, characterized in that the two arms have a common axle and a common fixed point for securing the two chains.

3. A delimbing arrangement according to claim 1, the drive means for each arm being a hydraulic means, characterized in that it comprises a pressure accumulator, which is placed in the pressure line effecting abutment of the arms and is charged via said line for automatically compensating for the movement of the arms at the passage along the tree stem decreasing in thickness towards the top end.

* * * * *